(12) United States Patent
Goldman

(10) Patent No.: US 8,355,968 B2
(45) Date of Patent: Jan. 15, 2013

(54) METHOD OF IDENTIFYING POTENTIAL TARGETS FOR A CAPITAL TRANSACTION

(75) Inventor: Neal D. Goldman, New York, NY (US)

(73) Assignee: Capital IQ, Inc., New York, NY (US)

( * ) Notice: Subject to any disclaimer, the term of this patent is extended or adjusted under 35 U.S.C. 154(b) by 3784 days.

(21) Appl. No.: 09/978,959

(22) Filed: Oct. 16, 2001

(65) Prior Publication Data

US 2002/0073006 A1 Jun. 13, 2002

Related U.S. Application Data

(63) Continuation-in-part of application No. 09/388,838, filed on Sep. 1, 1999, now abandoned.

(51) Int. Cl.
*G06Q 40/00* (2006.01)
(52) U.S. Cl. ............. 705/35; 705/36; 705/37; 705/38; 705/39; 705/80
(58) Field of Classification Search ............. 705/35, 705/36, 37, 38, 39, 80
See application file for complete search history.

(56) References Cited

U.S. PATENT DOCUMENTS

| | | |
|---|---|---|
| 3,573,747 A | 4/1971 | Adams et al. |
| 4,348,744 A | 9/1982 | White |
| 4,422,158 A | 12/1983 | Galie |
| 4,860,352 A | 8/1989 | Laurance et al. |
| 4,992,940 A | 2/1991 | Dworkin |
| 5,086,394 A | 2/1992 | Shapira |
| 5,122,952 A | 6/1992 | Minkus |
| 5,128,871 A | 7/1992 | Schmitz |
| 5,164,897 A | 11/1992 | Clark et al. |
| 5,251,131 A | 10/1993 | Masand et al. |
| 5,325,475 A | 6/1994 | Poggio et al. |
| 5,446,686 A | 8/1995 | Bosnyak et al. |
| 5,450,504 A | 9/1995 | Calia |
| 5,475,757 A | 12/1995 | Kelly |
| 5,500,793 A | 3/1996 | Deming, Jr. et al. |
| 5,592,375 A * | 1/1997 | Salmon et al. ............ 705/7 |
| 5,664,115 A | 9/1997 | Fraser |
| 5,724,524 A | 3/1998 | Hunt et al. |
| 5,734,890 A * | 3/1998 | Case et al. ............ 707/5 |
| 5,754,850 A | 5/1998 | Janssen |
| 5,794,207 A | 8/1998 | Walker et al. |
| 5,864,827 A | 1/1999 | Wilson |
| 5,895,453 A * | 4/1999 | Cook ............ 705/22 |
| 5,905,975 A | 5/1999 | Ausubel |
| 5,913,202 A | 6/1999 | Motoyama |

(Continued)

OTHER PUBLICATIONS http://www.nvst.com, Copyright 1996-1999.*

(Continued)

*Primary Examiner* — Nga B. Nguyen
(74) *Attorney, Agent, or Firm* — Rothwell, Figg, Ernst & Manbeck PC

(57) ABSTRACT

A method of identifying potential targets (i.e., buyers, investors, sellers, or acquisition targets) for a financial transaction. The method enables a user to specify at least one investment criteria based on which to run a search to identify the prospective targets, and to select a universe within which to search for the prospective targets. The method also enables the user to specify a type of financial transaction. A scoring algorithm that is used to score the results of the search is selected based on the user's specification of the type of financial transaction.

16 Claims, 5 Drawing Sheets

U.S. PATENT DOCUMENTS

| | | | |
|---|---|---|---|
| 5,924,082 | A | 7/1999 | Silverman et al. |
| 5,966,699 | A | 10/1999 | Zandi |
| 5,978,778 | A * | 11/1999 | O'Shaughnessy .......... 705/36 R |
| 5,995,947 | A | 11/1999 | Fraser et al. |
| 6,012,051 | A * | 1/2000 | Sammon et al. ................ 706/52 |
| 6,035,286 | A * | 3/2000 | Fried ........................... 705/36 R |
| 6,141,653 | A | 10/2000 | Conklin et al. |
| 6,175,824 | B1 * | 1/2001 | Breitzman et al. .......... 705/36 R |
| 6,272,467 | B1 * | 8/2001 | Durand et al. .................... 705/1 |
| 6,297,819 | B1 | 10/2001 | Furst |
| 6,349,290 | B1 | 2/2002 | Horowitz et al. |
| 6,366,925 | B1 | 4/2002 | Meltzer et al. |
| 2001/0039508 | A1 | 11/2001 | Nagler et al. |

OTHER PUBLICATIONS

Moriarty, "Private companies Join Online Action", Venture Capital Journal, pp. 5, 16, Jul. 1, 1999.*

Gannon, "Batterson Launches New Fund, VC Online", Venture Capital Journal, p. 6, Apr. 1, 1999.*

Fisher, "Venture Capital: a start-up guide to electronic resources", Database, v20, n1, p. 34(11), Feb.-Mar., 1997.*

Website printout: Exclusive Online Access to Quality M&A Opportunities: About Us, eMergers.com, 2 pp., 1999.

Website printout: Exclusive Online Access to Quality M&A Opportunities: Current Exclusive Sale, Current Acquisition Mandate, eMergers.com, 9 pp., 1999-2001.

Website printout: Mergers and Acquisitions on CbeX—The Confidential Business Exchange, CbeX, Inc., 3 pp., 1996-2000.

Website printout: Private Equity Network®, NSVT.com, 3 pp., 1999.

Website printout: BizSale-Linking Business Buyers and Sellers, Affiliated Business Consultants, Inc., 13 pp., 1999.

Website printout: iDeal Match, vcapital.com Venture Capital Online, 8 pp., Jan. 2000.

Website printout: ...financing inspiration, Angeltips.com, 9 pp., 1999.

Website printout: Welcome to Garage.com, Garage.com, 6 pp., 1998-2000.

Website printout: Welcome to eSource, Silicon Valley Bank, 2 pp., 1999.

Website printout: The Business Alliance, Inc., 5 pp., Jan. 2000.

George S. Oldfield, et al., Risk management in financial institutions, Sloan Management Review, Cambridge, proquest.umi.com, 14 pp., Fall 1997.

Website printout: Begin Your Financing Request, Capital.com, The Source to Business Finance, 4 pp., ©2000,2001.

Website printout: Venture Capital Marketplace, v-capital.com.au, 5 pp, ©1995-2003.

* cited by examiner

Capital IQ

My Projects | Visited Profiles | Help | Client Support | Logout

Search

My Capital IQ | Company Intelligence | Industry Intelligence | Analytics & Targeting | Coverage Management | Transaction Management

Targeting Engine
  Find Buyers
Screening
  Company Screening
Transaction Searches
  Growth Capital
  Capital IQ M&A
  Financial Buyer
Comparables
  Create Comp Set
Capital IQ Intelligence
  Hot Searches Tracking Code: Assign

Buyer or Investor Targeting > Select Criteria
If you want to limit your search (so one or more of the criteria you've selected MUST appear in each search result), check the box next to that criterion. To remove a criterion click the link Industry Classifications                          Financial Criteria Industries of Interest
                                                  Stages of Interest
Company Industry Classifications Keywords                                          Geographies Of Interest Buyer Office Locations Portfolio Company Locations

[Delete All]     [Next >]

Select Criteria For Your Investor Targeting
The more data points that you provide, the more precise the search will be
Classification Wizard
Use our classification wizard to select criteria releated to industries, geographies, and stages of interest
Keywords
Input keywords (searches business descriptions of all companies).

Keyword: [          ]    [Add Criteria]

Financial Criteria
Input certain financial statistics about the company for which you are investor targeting.

Investment Criteria:

Equity Investment ($mm):  [     ]    Sales ($mm):            [     ]

Operating Income ($mm):   [     ]    Enterprise Value ($mm): [     ]

Buyer Size:                      Less Than   OR   Greater Than   OR   Between Lower and Upper Sponsor Fund Size ($mm)             [    ]          [    ]              [    ] [    ]

Strategic Buyer Market Capitalization  [    ]       [    ]              [    ] [    ]
($mm):

[Add Criteria]

© 2000-2001 Capital IQ, Inc. All Rights Reserved          Help | Client Support | Logout

FIG. 2

|  | SEARCH |
|---|---|

| Industry Tree | Geography Tree | Stages |
|---|---|---|

Select
- ☐ Energy
- ☐ Materials
- ☐ Industrials
- ☐ Durable Goods
- ☐ Non-Durables and Staples
- ☐ Retail and Distribution
- ☐ Healthcare
- ☐ Media
- ☐ Financial Services
- ☐ Real Estate
- ☐ Leisure
- ☑ Technology
  - ☐ Electronics
  - ☐ Technology Hardware & Equipment
  - ☐ Software
  - ☑ Semiconductor Equipment and Products
    - ☑ Semiconductors
      - ☐ Analog/Mixed Signal
      - ☑ Digital
        - ☐ Microprocessors
        - ☐ Memory Chips
    - ☐ Semiconductor Manufacturing Machinery
  - ☐ Technology Services
- ☐ Telecommunication Services

| ADD CRITERIA | CLEAR |
|---|---|

FIG. 3A

|  | SEARCH |
|---|---|
| Industry Tree | Geography Tree | Stages |

```
Select
  ☐ Africa/Middle East
  ☐ Asia
  ☐ Caribbean
  ☐ Central America
  ☐ Europe
  ☑ North America
      ☐ Canada
      ☐ Mexico
      ☑ United States of America
          ☐ Great Lakes
          ☐ Midatlantic
          ☐ Midwest
          ☐ Mountain
          ☐ New England
          ☐ Northeast
          ☐ Pacific
          ☐ Southeast
          ☐ Southwest
          ☐ West Coast
  ☐ South America
```

| ADD CRITERIA | CLEAR |
|---|---|

FIG. 3B

|  | SEARCH |
|---|---|
| Industry Tree | Geography Tree | Stages |

Select
- ☐ Incubation
- ☐ Seed/Startup
- ☐ Early Venture
- ☐ Mid Venture
- ☐ Late Venture
- ☐ Emerging Growth
- ☐ Growth Capital
- ☐ Middle Market
- ☐ Buyout
- ☐ Recapitalization
- ☐ Industry Consolidation
- ☐ Mature
- ☐ SubDebt
- ☐ Bridge
- ☐ Turnaround
- ☐ PIPES
- ☐ Seeking Acquisition

| ADD CRITERIA | CLEAR |
|---|---|

FIG. 3C

METHOD OF IDENTIFYING POTENTIAL TARGETS FOR A CAPITAL TRANSACTION

CROSS-REFERENCE TO RELATED APPLICATIONS

This application is a continuation-in-part of application Ser. No. 09/388,838 now abandoned entitled EFFICIENT METHOD OF PRIVATE COMPANY FINANCING, which was filed on Sep. 1, 1999.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention is in the general field of private capital financing and pertains, in particular, to a method of identifying potential targets (i.e., buyers, investors, or sellers) for a capital transaction.

In the past several years, the amount of private capital from, e.g., private capital funds ("capital firms") or other, institutional, investors has increased tremendously. Additionally, investors in private capital funds have experienced growth in total assets under management and distributions from prior investments in capital firms, all of which must be reinvested. Finally, service companies such as commercial banks, investment banks and consulting firms have generated an increasing amount of business from capital firms and therefore have increased their investments in capital firms to strengthen those relationships.

The additional capital has created a challenge to capital firms in keeping pace with investing the total capital supply available to them. This oversupply of capital is having a profound effect on the market and on the ability of capital firms to generate high returns. As the supply of capital increases, the rate of return decreases. To maintain a high level of return, capital firms have increased their risk profile to achieve those higher returns. Many of these capital firms have become industry focused and employ such techniques as consolidation or add-on acquisitions. Consolidations consist of buying several smaller companies in the same field and creating a single larger entity with greater capability than the individual companies had. Add-on acquisitions comprise starting with a single mid-sized company and adding several smaller companies to achieve one large company.

Add-on investments are very attractive because they benefit both the buyer and the seller. From the buyer's perspective, add-on investments allow the buyer to purchase smaller companies less expensively, relative to larger companies, keeping the average cost for the entire company down. Additionally, cost savings and revenue enhancements can be achieved due to the synergies of the multiple add-on investments. Finally, the larger company presents the buyer with better exit options and better exit pricing.

The market for small companies is currently inefficient because capital firms' emphasis on small companies on a stand-alone basis or as add-on acquisitions is relatively low and advisers to small and venture stage companies are typically unsophisticated in add-on opportunities and buyer identification in general. Full service investment banks and the larger capital firms simply are unaware of many of the smaller deal, add-on acquisition opportunities that are available. The small fees involved do not motivate investment banks to take on small and venture-stage companies as clients. Therefore, there is a need for a method of doing business whereby these small companies which are not attractive to the large investment banks can acquire growth capital or be sold. A method is required whereby the sources of capital willing to invest in such markets can be efficiently matched with those companies that are either seeking additional capital or are interested in selling the entire operation to a third party. Additionally, a method is required to generate additional investment opportunities to present to capital firms. Additionally, a method is required to present such opportunities to capital firms and facilitate resulting transactions. Finally, a method is required whereby potential targets (i.e., buyers, investors, sellers, or acquisition targets) for a capital transaction can be identified on the basis of relevant criteria or characteristics.

SUMMARY OF THE INVENTION

It is a goal of the present invention to provide an efficient manner for companies to pursue capital transactions with capital firms or other, institutional, investors (collectively "potential investors"). This method includes storing information relevant to the potential investors including the types of investments they make and matching these investments with new investment opportunities. This is done by establishing a database which includes all of the relevant information for potential investors including investments they have made and seek to make. This would include detailed information about the companies that have been invested in. Further, investment opportunities offered to the potential investors are tracked from the time they are first offered to a potential investor until either the opportunity is accepted or declined.

For this system to be effective, there must be a central location where all the relevant materials are organized. In that way, a comprehensive database can be created with information on many private equity and venture capital firms and the companies they own. Additionally, this database, which can be stored on a computer, contains various information about each of the potential investors, which include private equity funds, venture capital funds, pensions, and the like. This data, the preferences, includes both qualitative and quantitative data, including inter alia, preferred investment size, preferred target company sales range, preferred target company operating income, earnings before interest and taxes (EBIT) or earnings before interest, taxes, depreciation and amortization (EBITDA), preferred target company enterprise value, preferred security type (i.e., common equity, preferred equity, senior debt, subordinated debt), preferred stage of target company development, preferred target company geography, preferred target company ownership position available (i.e., full control, minority control), industries targeted for investment and details relating to the transaction characteristics (i.e., type of securities purchased, enterprise value, investment size, ownership position taken) and target companies representing current investments and past investments including, inter alia, description of products and services offered and the related SIC codes or other customized identification codes, operating performance statistics (i.e., sales, operating income, EBIT, EBITDA), geography, and industries or products or geographies targeted for expansion through acquisition or investment. Other data can also be tracked if it will become relevant to a potential investor's investment goals.

When a private company is seeking a capital transaction (growth capital or sale) with a potential investor, for example, the private company or its agents may make use of the inventive method to identify a suitable match for a potential investor. A system based on the inventive method disclosed herein yields greater efficiency because, instead of the "mass mailing" of an identical proposal to all capital sources, this method targets the potential investors most likely to be interested in a capital transaction with the private company. Additionally there are many potential investors that are unknown to the general public and therefore would not have been part of a mass mailing. This system is far more efficient because the proposal is only sent to those potential investors with an interest or potential interest in the field, and the due diligence process is greatly enhanced due to a buyer who understands the business to be purchased. This system also provides a potentially paperless delivery of information.

The method provides the ability to identify potential investors. In this manner, the private company benefits because a concise, efficient offering is made which would otherwise miss potential investors. Other parties that refer private companies for inclusion in the database ("referral partners") also benefit because they have a resource to assist friends or clients that may be seeking a capital transaction, and may receive a portion of a transaction fee therefrom.

Customized offerings are provided to potential investors. These customized offerings receive more attention and, thereafter, subsequent deals also receive more attention. Potential investors are more likely to pay special attention to these customized offerings, and thus the probability of them overlooking a potential investment opportunity is lessened. The company benefits in that the offering receives faster attention due to the potential investors' ease in understanding the offering. Using the Internet allows for faster sharing of information, and that information is also organized in a more understandable form. Finally, when the business transactions are closed, the company benefits in that the business transaction is finalized, and the potential investor benefits possibly in revenue and cost synergies as well as the possibility of post-transaction added value. While this method is described in terms of offering private companies to potential investors, the same (including public companies) or other smaller assets such as patents can be offered in a similar manner to other buyers or investors, such as individuals or companies.

It is another goal of the present invention to provide a method for identifying targets (i.e., buyers, investors, or sellers) for a capital transaction. According to a further feature of the method described herein, a user of the method specifies at least one investment criterion based on which a search is run to identify the targets, and selects a universe within which to search for the targets. The method also enables the user to specify a type of capital transaction. A scoring algorithm that is used to score the results of the search is selected based on the user's specification of the particular type of capital transaction.

The above, and other features, aspects, and advantages of the present invention will become apparent from the following description read in conjunction with the accompanying drawings, in which like reference numerals designate the same elements.

BRIEF DESCRIPTION OF THE DRAWINGS

In the drawings:

FIG. 2 shows an exemplary screen used to input data used in the method shown in FIG. 1; and FIGS. 3A-3C show certain criteria used in the method of the present invention organized in hierarchical structures.

DESCRIPTION OF THE PREFERRED EMBODIMENTS

Figure 1:
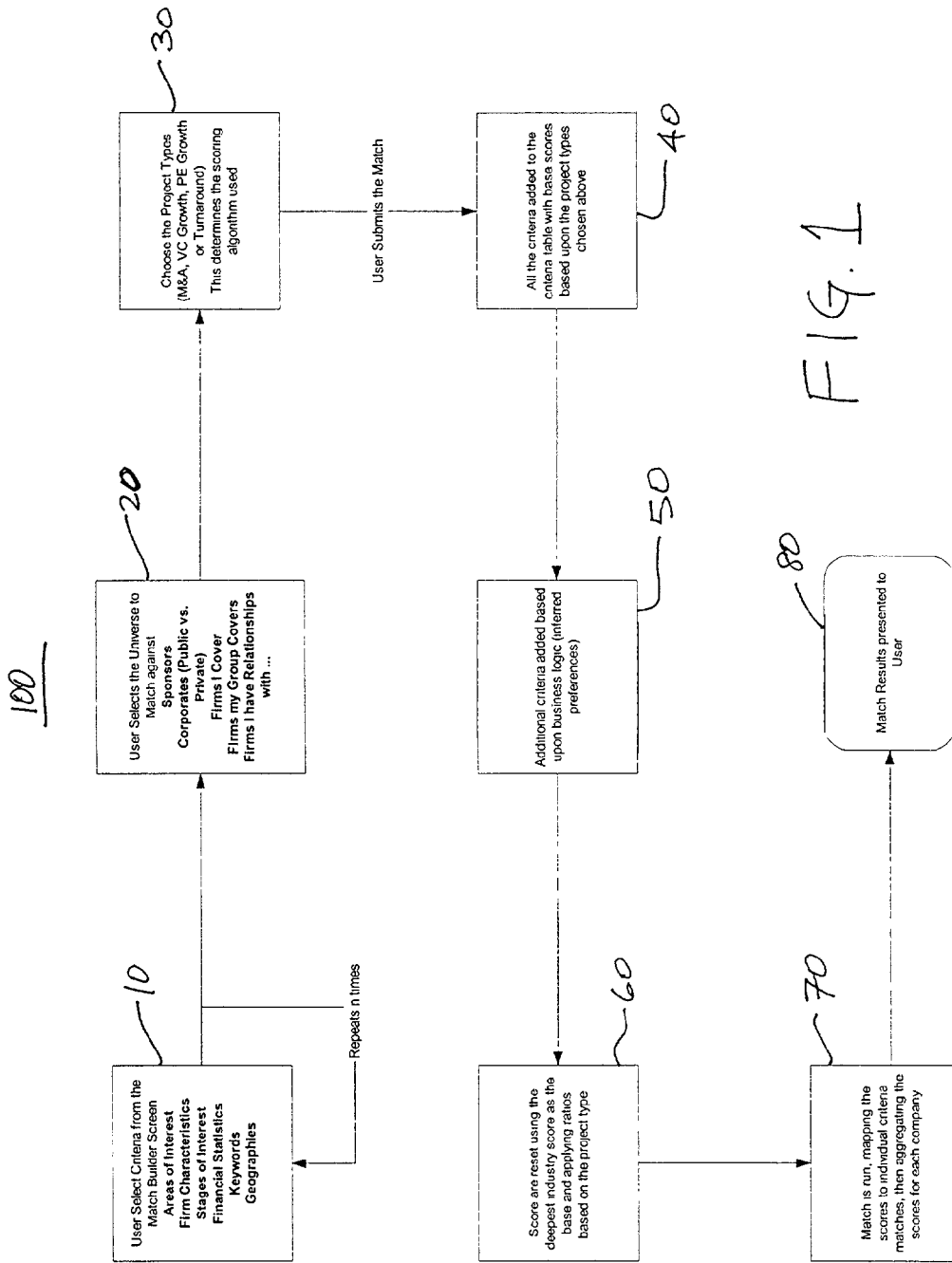
FIG. 1 shows a flow chart of the steps of a method according to the present invention.

According to an embodiment of the present invention, the method disclosed herein provides an efficient manner for companies to obtain growth capital or be sold. The inefficiencies of the private capital market are removed thereby yielding an efficient manner for private companies to obtain growth capital or be sold. This is accomplished by matching potential investors with the private companies seeking additional capital or a sale.

The inefficiency in the smaller deal markets is removed by creating a very close match between the private companies and the potential investors to which the private company is offered. To begin this process, extensive information is gathered with respect to the sources of capital. The information required about the potential investors includes the preferences which are both quantitative and qualitative and include, inter alia, preferred equity investment size, target companies sales range, target companies operating income, target company enterprise value, preferred security type, preferred stage of development, geographic preference, preferred ownership position, industries targeted for investment, current investment and past investment. This information is very important to help tailor any future offer to that capital source.

A further breakdown on some of these preferences may be appropriate. The geographic preference of a potential investor can be reviewed for specific geographic areas of interest or a specific area a company would like to invest in or further it could be a zone within which the company is looking for further acquisitions. The size preference of an investment can be measured either as the target private companies sales or EBIT. The importance of knowing what industries a has invested in is important as the deal progresses because knowledge of the industry that the private company is in greatly enhances the's ability to perform due diligence.

Likewise, as much information as possible is acquired about the private company which is seeking a capital transaction. A capital transaction is either a sale of the company or obtaining growth capital. This information will be used to match the private company to the potential investor. Further, the system provides an automatic process for contacting potential investors and tracking the progress of an offer until the offer is accepted or declined. Tracking consists of establishing a report which details the initial contact with the potential investors, the response of the potential investor and the correspondence with the capital firm until the deal is closed or rejected. In this manner it will be possible to learn and refine the type of investment opportunities in which the potential investor is interested.

The extensive knowledge about various sources of capital and the mechanism to solicit them provides a service which is not currently available. This allows private companies to access those sources of capital which would otherwise be unavailable to them. Further, these sources of capital will quickly understand the business opportunity being presented to them. This extensive knowledge will assist in quickly determining if the potential investor is interested in the opportunity. Further, the system allows for a paperless process to deliver information to the most likely sources of capital as well as subsequent flow of information amongst the parties.

In one embodiment of the invention a business owner provides the relevant information regarding the private company seeking capital. This information is then placed on a password protected web page on the Internet. Utilizing the information provided by the business owner, a list of the potential investors which might be interested in investing in the private company is created. In the Internet model, a letter or e-mail is sent to a contact person at the potential investor which would include an overview of the private company with the customized rationale for why it is likely that the potential investor will have an interest (i.e., reasons for the match) as well as the password to gain access to the private company's web page. This log would be used to refine future offers. The log will also record whether or not and how frequently the potential investor accesses the web page, for how long the web page was accessed, and any information that is downloaded from the web page in each incidence.

The tracking log is used to automatically generate a follow-up letter which is customized to each potential investor to which the private company is being offered. The follow-up letter is also entered into the log to track the progress of the deal within the potential investor. The log will also track the types of deals which the potential investors accept or reject. When the deals are closed (i.e., funding is provided) this is also noted. This helps further refine the offers made to each potential investor.

The web page is maintained by the company which has established the capital firm and corporation database (the system proprietor, method proprietor, or the database proprietor). This also allows the method proprietor to assist the private company in approaching the appropriate potential investors. This database service can also be offered, to other agents, private companies or other third parties to efficiently improve capital transactions. The database can be offered for a fee which is either a flat fee or a percentage of the transaction. The agent or third party may be the database proprietor. Further, the process of tracking the offers and creating follow up contacts with the potential investors can be provided to agents of private companies or third parties without access to the database.

This method may also generate transaction fees. The transaction fee is a fee which is paid upon the closing of a capital transaction to the third party or agent responsible for initiating the contact between the private company and potential investor. Additionally, other parties can be involved in the transaction. Such parties (referring partners) can share in the transaction fee by referring investment opportunities to the method proprietor. A referring partner can refer potential transactions, i.e. private companies seeking a capital transaction which would be either growth capital or sale to the database proprietor, agent or third party. This referring partner would then share in the transaction fee. In this scenario the database proprietor, agent or third party would receive 75% of the transaction fee and the referring partner would receive a 25% share. If the first partner then refers a second partner and that second partner refers a transaction, the second partner would receive a 25% share of the transaction fee while the initial partner would receive a 12.5% share and the database proprietor, original agent or third party would receive a 62.5% share. The system can then include further partners. For example, if the second partner then introduces a third partner the third partner receives 25% of the transaction fee, the second partner receives a 12.5% share in the transaction fee and the original partner receives 7.5% of the transaction fee while the database proprietor, agent or third party receives a 55% share of the transaction fee. This sharing of the transaction fee can include more partners and different sharing percentages than the three given as an example.

The proposed method also includes an on-line method for correspondence between the private company or agent and the potential investor. While the potential investor is accessing the private company's transaction specific web page, the potential investor will be able to correspond with the agent or private company. Additionally, agreements can also be electronically signed on the web page so that interim agreements may be negotiated and executed and deals may be finalized on the web page.

The method also encompasses those deals which are not done via the Internet. A private company which is seeking capital would approach an agent or third party which would generate a focused list of potential investors. The third party or agent would be aware of the potential investor's preferences and use them to generate a focused list. These preferences would be tailored to the investments in which the potential investor is interested. As discussed above these preferences would include size of investments, geographic locations of investments, SIC coding, product preferences and the like. Using these preferences the agent, third party, or private company itself would prepare a list of potential investors to initiate contact with. The system would then generate a customized mailing to each of the identified potential investors. This customized mailing would be tailored to the potential investor in that it would be personally directed to an individual at that potential investor, as well as customized to highlight any information in which that potential investor would be particularly interested. The particular interest could include a specific market that the potential investor is in and that the private company seeking capital is involved in, relevant geographic area or the like. This initial contact would be tracked in a log. The log would then be used to generate a follow-up contact which would be also become part of the tracking log. The follow-ups can be done using letter, phone, fax or e-mail. As the contacts are made with the potential investor, these contacts are logged to further refine future offers for that specific potential investor. Deals which are either closed or rejected also help to refine future offers. In that manner, the preferences including, inter alia, the current investments of a potential investor as well as the previous investments, i.e., companies that the firm previously invested in but no longer owns and investment preferences learned from prior offerings, assist in establishing the potential investor preferences for future offers.

The typical transaction which is tracked begins with the initial offer which is a customized mailing by either a third party, agent or the private company to various potential investors. The interested potential investors would then, if necessary, execute a confidentiality agreement with the private company. After that there would be a time period during which preliminary due diligence is preformed. This preliminary due diligence is enhanced timewise because the potential investors' previous related experience (due to events that generated their preferences) make the potential investor better able to efficiently perform preliminary due diligence. Next, letters of intent are signed and complete due diligence is undergone. Finally, the financing is arranged, documentation for the transaction is prepared and the deal is closed. The agent or third party can be involved in this entire process by providing many of the necessary documents via the Internet to quickly and efficiently process the transaction. This entire process is tracked to refine the process for future matching of private companies with potential investors.

When the potential investor accesses the transaction web page of a private company, the web page can be "personalized" via cookies or other identification means such as a log-in name or password, to provide a customized, interactive web page which is geared toward that potential investor's interests and needs (i.e., preferences). Additionally, the private company may access the database which contains all the information about the selected potential investors with which they are matched. Additionally, the web functionality relating to presenting private company investment opportunities to potential investors and facilitating the resulting transactions can be offered independently.

According to another embodiment of the present invention, the proposed method further includes a robust and efficient method for identifying potential targets (i.e., buyers, investors, or sellers) for a capital transaction. According to an embodiment of the present invention, the proposed method mimics investment banking logic by giving weight to explicit characteristics of a transaction (such as expressed areas of interest and relative size of the company), as well as empirical or implied preferences (such as the potential investor's investment or divestiture activities). The method receives input from a user, preferably through an easy to navigate interface, and uses a sophisticated scoring and logic system to determine appropriate matches. For example, the method can be used to identify likely buyers or investors for a company based on selected criteria; to identify a target or an add-on having particular characteristics; or to select transaction characteristics and search for relevant investments and acquisitions.

The method, generally designated by numeral 100, will now be explained with regard to FIGS. 1-3. Referring to FIG. 1, in step 10 a user enters information relating to any combination of the following criteria for a firm: (1) Areas of Interest; (2) Firm Characteristics; (3) Stages of Interest; (4) Financial Statistics; (5) Keywords; and (6) Geographies. The "Areas of Interest" criterion relates to the industry in which a firm is interested in investing. The "Firm Characteristics" criterion relates to the industry in which the firm operates. The "Stages of Interest" criterion relates to the position of the companies in their growth cycle that a firm is interested in investing in. The "Financial Statistics" criterion is used to search for firms having a particular size, as demonstrated by the firms financial data. Keywords are used to search the firm's business description. Finally, the "Geographies" criterion relates to the geographic scope of the firm. As shown in FIG. 1, step 10 is repeated until all the desired information is input by the user. In a preferred embodiment of method 100, the user has the option to "limit" his search by any of the above criteria, thereby requiring any resulting match to include the particular criteria.

The information is entered into the fields of a computer screen. An exemplary computer screen used in conjunction with a preferred embodiment of method 100 is shown in FIG. 2. Certain of the criteria, e.g., Areas of Interest, Firm Characteristics, and Geographies, are organized in a "tree" (i.e., hierarchical) format. As shown in FIGS. 3A-3C, the Areas of Interest and Firm Characteristics criteria correspond to the Industry Tree and the Geographies criterion corresponds to the Geography Tree. The deeper the level of the tree, the more specific the match. As will be explained in more detail further herein, the specificity of the match, as indicated by the depth of the match in the tree, is a key factor in determining the score of a resulting match.

In step 20 the user selects the universe of firms that are to be searched. For example, the user can select from several categories, including "Sponsors" (i.e., capital firms), "Public Corporates" (i.e., public companies that invest in other companies), "Private Corporates" (i.e., private companies that invest in other companies), "Firms I Cover" (i.e., firms that the user of the system is responsible for following), "Firms My Group Covers" (i.e., firms that the user's group is responsible for following), and "Firms I Have A Relationship With" (i.e., firms with whom the user has developed a relationship).

In step 30, the user then chooses the type of project that he is working on. In a preferred embodiment of the proposed method the types of projects can include Mergers and Acquisitions ("M&A"), Venture Capital Growth ("VC Growth"), Private Equity Growth ("PE Growth"), or Turnarounds. According to an inventive aspect of method 100, the selection of a particular deal type determines the algorithm that is used to assign a score to the resulting matches.

After the project type has been selected in step 30, the user submits the information from steps 10, 20, and 30 to determine the resulting matches. According to an embodiment of the present invention, in step 40 each of the criteria from step 10 of method 100 is assigned a base score that is a function of the type of project that the user has selected. For example, the Areas of Interest criteria has a different base score in step 40 depending on whether the project type selected by the user is M&A, VC Growth, PE Growth, or Turnaround.

According to a further embodiment of the present invention, method 100, in step 50, infers additional investment criteria based on the application of investment banking logic to the criteria from step 10. For example, if the Financial Statistics criterion from step 10 specifies that the firm should have annual sales of $10,000,000, step 50 of method 100 may infer an additional criterion that the firm should have an annual operating income between $1,000,000 and $2,000,000. Other such inferred criteria will be well known to those of ordinary skill in the art, and will not be described further herein.

In step 60, a maximum industry score is calculated. The calculation of the industry score is explained with reference to FIG. 3A, which shows an exemplary hierarchical industry structure (i.e., tree) used in a preferred embodiment of the method of the present invention. The top level node of the tree is a general industry, e.g., Technology, and has a base score assigned to it that is a function of the project type selected in step 30. The tree may also have further sub-level nodes that represent more specific industries within the general industry represented by the top level node of the tree. For example, a fourth-level node of the Technology tree represents a very specific technology industry, e.g., Digital Semiconductors. The score associated with a sub-level node is calculated by raising the base score of the top level node to the power of the sub-level. For example, if the Technology industry has a base score of 4, the Semiconductor node has a score of $4^4$, or 256, because the Digital Semiconductor node is a fourth-level node.

Once the maximum industry score is calculated, the scores for associated criteria (e.g., Firm Characteristics, Stages of Interest, Financial Statistics, and Geographies) are normalized to the industry score. According to a feature of the present invention, the maximum industry score is used as a base score and the maximum scores for the associated criteria are derived by applying to the base score ratios that correspond to the type of project that the user is working on. Each of the criteria may have a different corresponding ratio based on the project type (e.g., M&A, VC Growth, PE Growth, or Turnarounds). For example, based on experience, method 100 may weight the Stages of Interest matches as not being as important as the Areas of Interest (i.e., industry) matches for an M&A project or deal, and thus may set the maximum score for the Stages of Interest criterion at one-fourth of the industry score. Conversely, method 100 may weight the Stages of Interest matches as being more important than the Areas of Interest (i.e., industry) matches for a Turnaround project or deal, and thus may set the maximum score for the Stages of Interest criterion at twice the industry score.

In step 70 the user submits the search criteria, and the universe of firms selected in step 20 is searched to discover those firms that match one or more of the criteria selected by the user in step 10. A score is assigned to each firm of step 20 for each match with one of the criteria specified in step 10. The scores for each firm are then aggregated to provide a standalone score for each firm based on the criteria of step 10.

According to a further feature of the present invention, a portfolio score is also calculated for each firm by analyzing the previous investments of the firm using the same criteria. A "portfolio company" is a company in which the firm has an investment. Thus, for example, in the case where the target firm is a potential buyer, each portfolio company of the firm is scored using the same methodology as for the potential buyer. These scores are then aggregated by taking the maximum score of all the portfolio companies and adding the count of portfolio companies. This score is the portfolio score for a potential buyer.

The standalone and portfolio scores for each firm are ultimately totaled to arrive at an overall score for each firm. In step 80 the results of the search are ranked by overall score for each firm and are displayed to the user.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of identifying potential targets for a capital transaction, said method comprising the steps of:
enabling a user to specify at least one investment criterion;
enabling said user to specify a type of said capital transaction, wherein the type of capital transaction is a (1) merger and acquisition, (2) venture capital growth, (3) private equity growth, or (4) turnaround;
selecting, using a computer, a scoring algorithm based on said user's selection of said type of capital transaction for assigning scores for said potential targets;
organizing, using said computer, at least one of said investment criteria in a hierarchical structure wherein said organizing step comprises the step of arranging said hierarchical structure such that increasing depth of said hierarchical structure corresponds to increased specificity of said investment criteria;
selecting, using said computer, said investment criteria from the group consisting of industry classification, firm characteristics, and geographies; and
normalizing, by said computer, maximum scores of said investment criteria to a score for said industry classification criterion.

2. The method of claim 1, wherein assigning scores comprises the step of setting a base score for each of said investment criteria based on said type of capital transaction.

3. The method of claim 1, further comprising the step of generating a base score for said hierarchical structure.

4. The method of claim 3, further comprising the step of raising said base score of said hierarchical structure to a power that is representative of said depth of said hierarchical structure.

5. The method of claim 1, wherein said normalizing step comprises multiplying said score for said industry classification by a ratio that corresponds to said type of capital transaction.

6. The method of claim 5, further comprising the steps of: assigning a score to said potential target for each match between said potential target and one of said investment criteria specified by said user; and aggregating said scores for each potential target to provide a standalone score for each potential target.

7. The method of claim 6, further comprising the steps of: calculating a portfolio score for each potential target; and summing said standalone score and said portfolio score for each potential target to provide an overall score for each potential target.

8. The method of claim 7, further comprising the step of ranking said potential targets on the basis of said overall score.

9. The method of claim 8, wherein said potential targets are potential buyers of a company.

10. The method of claim 8, wherein said potential targets are potential investors in a company.

11. The method of claim 8, wherein said potential targets are potential sellers of a company.

12. The method of claim 8, further comprising the step of inferring additional investment criteria based on said at least one investment criteria specified by said user.

13. The method of claim 1, further comprising automatically contacting potential investors with an offer of a capital transaction and tracking the progress of the offer until the offer is accepted or declined.

14. The method of claim 13, wherein tracking comprises establishing one or more report which details the initial contact with the potential investors, the response of the potential investors, and the correspondence with the potential investor until the offer is closed or rejected.

15. The method of claim 13, wherein tracking comprises:
generating a follow-up letter customized to each potential investor contacted with the offer; and
entering the follow-up letter into a log to track the progress of the deal with the potential investor.

16. The method of claim 1, further comprising gathering and storing information with respect to possible targets, said information comprising data selected from the group consisting of preferred equity investment size, target company sales range, target company operating income, target company enterprise value, preferred security type, preferred stage of development, geographic preference, preferred ownership position, industries targeted for investment, current investment, and past investment.

* * * * *